Patented Nov. 14, 1939

2,180,081

UNITED STATES PATENT OFFICE 2,180,081

COMPOSITION OF MATTER

Martin Mueller-Cunradi, Michael Otto, Walter Daniel, and Robert Werner, Ludwigshafen-on-the-Rhine, Germany, assignors to I. G. Farbenindustrie Aktiengesellschaft, Frankfort-on-the-Main, Germany No Drawing. Original application July 3, 1934, Serial No. 733,626. Divided and this application May 4, 1937, Serial No. 140,692. In Germany July 8, 1933

10 Claims. (Cl. 47—8)

This invention relates to new and useful compositions of matter, more particularly to those which consist of an adhesive material and if desired waxes, or the like.

As is well known, the usual adhesives are not adapted for making up compositions of the said kind.

Now, the present invention makes use of the discovery that there are certain highly polymeric hydrocarbon materials which possess certain adhesive properties and are excellently adapted for making up such compositions of matter.

It has been found that the high polymers of iso-olefines, more particularly of isobutylene are such hydrocarbon materials possessing such adhesive properties.

The polymers used according to this invention are materials having a very high molecular weight, usually of at least about 1000 and ranging up to a value in the neighborhood of 10,000 and even much higher, depending on the manner in which they are made. Such polymers may be obtained by polymerizing unsaturated hydrocarbons such as isobutylene. The polymerization may be carried out at temperatures below 0° or preferably not exceeding 10° below zero C., and especially at between 40° and 80° below zero C. with a catalyst of the Friedel-Crafts type such as boron fluoride, although aluminium chloride, titanium tetrachloride, etc., may also be used in many cases. The molecular weight of the polymer generally depends upon the purity of the unsaturated hydrocarbon, the catalyst and the temperature of polymerization. The higher polymers are obtained at very low temperatures and with very pure olefines. These polymers are hereinafter sometimes referred to as "hydrocarbon resins" or "hydrocarbon viscoresins".

It is the polymers thus obtainable which we have found to possess the aforesaid adhesive properties and to be suitable for making up the compositions of matter.

The wide field of application of these hydrocarbon polymers will be first indicated in a general way by explaining broadly the typical fields where these polymers may be employed, thereafter a further explanation of the invention will be given in the form of specific examples.

By using the said polymers it is possible to impregnate fibrous materials, such as cloths, textiles, leather and the like. The compositions thus obtained may be used for example for adhesive plasters or as waterproof protective materials and the like.

The hydrocarbon polymers may also be used as sealing compositions.

The adhesive properties of the polymerized material may be further utilized for the manufacture of adhesive compositions for sealing wounds of trees or other plants. Such a composition may for example consist of polymeric isobutylene, wax and tallow. Thus, the hydrocarbon resins are useful in the art of tree surgery, as for example for the sealing of excoriated arboraceous tissues from the atmosphere.

The following examples describe the invention in detail. It should, however, be noted that our invention is not in any way limited to these examples. The parts are by weight.

Example 1

A mixture adapted for adhesive plaster is obtained by melting 40 parts of polymerized isobutylene of the specific viscosity of 4.8 (determined in a solution of 2.8 per cent strength in tetrahydronaphthalene) with 10 parts of brown-coal tar pitch.

Example 2

An excellent wax-like mixture for sealing wounds of trees is obtained by melting 15 parts of polymerized isobutylene of 8.2 specific viscosity (determined in a solution of 2.8 per cent strength in tetrahydronaphthalene) with 10 parts of white oil (paraffin oil) and 25 parts of wool-grease.

Example 3

An adhesive plaster is obtained by placing by rolling a thin layer of polymerized isobutylene having a specific viscosity of between about 70 and 80 (determined in a solution of 2.8 per cent strength in tetrahydronaphthalene) on textile material. If necessary antiseptic substances may be added.

The present application is a division of our copending application Ser. No. 733,626 filed July 3, 1934, now Patent 2,124,235.

What we claim is:

1. A composition of matter suitable for sealing wounds of plants comprising a high molecular polymer of an iso-olefine.

2. The process of sealing wounds of plants which comprises applying thereto a high molecular polymer of an iso-olefine.

3. In the art of tree surgery, the step of applying an adhesive, flexible, plastic, synthetic hydrocarbon resin to the wound.

4. In the art of three surgery, the step of sealing excoriated arboraceous tissues which comprises applying an adhesive, flexible, plastic, biologically inert, synthetic hydrocarbon resin to said tissues.

5. The art of sealing excoriated arboraceous tissues from the atmosphere which comprises applying to said tissues a polymerized hydrocarbon viscoresin.

6. The art of sealing excoriated arboraceous tissues from the atmosphere which comprises applying to said tissues a high molecular weight polymer of isobutylene.

7. A composition for sealing wounds of trees comprising an adhesive, flexible, plastic, synthetic hydrocarbon resin.

8. A composition for sealing wounds of trees comprising a polymerized hydrocarbon viscoresin.

9. A composition for sealing wounds of trees comprising a polymerized hydrocarbon viscoresin and a wax.

10. A composition for sealing wounds of trees comprising a high molecular weight polymer of isobutylene together with a wax.

MARTIN MUELLER-CUNRADI.
MICHAEL OTTO.
WALTER DANIEL.
ROBERT WERNER.

CERTIFICATE OF CORRECTION.

Patent No. 2,180,081.                                   November 14, 1939.

MARTIN MUELLER-CUNRADI, ET AL.

It is hereby certified that error appears in the printed specification of the above numbered patent requiring correction as follows: Page 1, second column, line 53, claim 4, for the word "three" read tree; and that the said Letters Patent should be read with this correction therein that the same may conform to the record of the case in the Patent Office.

Signed and sealed this 2nd day of April, A. D. 1940.

(Seal)
Henry Van Arsdale,
Acting Commissioner of Patents.